(12) United States Patent
Adar et al.

(10) Patent No.: US 8,978,415 B2
(45) Date of Patent: Mar. 17, 2015

(54) GLASS-COATED WIRES AND METHODS FOR THE PRODUCTION THEREOF

(75) Inventors: Eliezer Adar, Sde Varburg (IL); Yuri Bolotinsky, Netanya (IL)

(73) Assignee: WMT Wire Machine Technologies Ltd, Kadima (IL)

( * ) Notice: Subject to any disclaimer, the term of this patent is extended or adjusted under 35 U.S.C. 154(b) by 135 days.

(21) Appl. No.: 12/811,415

(22) PCT Filed: Jan. 4, 2009

(86) PCT No.: PCT/IL2009/000016
§ 371 (c)(1),
(2), (4) Date: Jul. 1, 2010

(87) PCT Pub. No.: WO2009/083994
PCT Pub. Date: Jul. 9, 2009

(65) Prior Publication Data
US 2011/0036123 A1    Feb. 17, 2011

(30) Foreign Application Priority Data
Jan. 3, 2008 (IL) .......................................... 188559

(51) Int. Cl.
C03B 13/12 (2006.01)
C03B 37/026 (2006.01)
B21C 37/04 (2006.01)

(52) U.S. Cl.
CPC ............. *C03B 37/026* (2013.01); *B21C 37/042* (2013.01)
USPC ........................... 65/59.6; 65/59.35; 65/59.27

(58) Field of Classification Search
CPC ........................... C03B 37/026; B21C 37/042
USPC ........ 65/45, 147, 59.27, 59.35, 59.6, 442, 47, 65/48, 49, 50
See application file for complete search history.

(56) References Cited

U.S. PATENT DOCUMENTS

| | | |
|---|---|---|
| 1,793,529 A | 2/1931 | Taylor |
| 3,214,805 A | 11/1965 | McKenica |
| 3,256,584 A | 6/1966 | Parkhachev |
| 3,362,803 A | 1/1968 | Dannöhl et al. |
| 3,481,390 A | 12/1969 | Veltri et al. |
| 3,483,072 A | 12/1969 | Cox et al. |
| 3,488,072 A | 1/1970 | Cox et al. |
| 3,607,201 A | 9/1971 | Zaborovsky et al. |
| 3,791,172 A * | 2/1974 | Manfre et al. .................. 65/537 |
| 4,133,664 A * | 1/1979 | Aulich et al. .................. 65/405 |
| 4,344,785 A * | 8/1982 | Jensen ............................ 65/488 |

(Continued)

FOREIGN PATENT DOCUMENTS

JP  47-51924  12/1972
WO  WO 2005/104052 A2  11/2005

OTHER PUBLICATIONS

Derwent abstract of JP 47-51924, Metal wires coated with glass production by simultaneous continuous withdrawal from vessel. Kiyoshi Itakura, Dec. 27, 1972.*

(Continued)

*Primary Examiner* — Queenie Dehghan
(74) *Attorney, Agent, or Firm* — Browdy and Neimark, PLLC

(57) ABSTRACT

An apparatus for producing a glass-coated wire, the apparatus comprising at least one heating device adapted to, independently, heat a core material to a melting temperature thereof and heat a glass material to a drawing temperature thereof.

10 Claims, 4 Drawing Sheets

(56) References Cited

U.S. PATENT DOCUMENTS

| | | |
|---|---|---|
| 5,110,334 A | 5/1992 | Ayers |
| 5,240,066 A | 8/1993 | Gorynin et al. |
| 5,344,123 A * | 9/1994 | Hanano et al. ............... 266/207 |
| 7,071,412 B2 | 7/2006 | Dittes et al. |
| 7,075,439 B2 | 7/2006 | Tyren et al. |
| 7,233,249 B2 | 6/2007 | Liebermann et al. |
| 7,254,963 B2 * | 8/2007 | Deprot et al. .................. 65/444 |
| 7,354,645 B2 | 4/2008 | Liebermann et al. |
| 7,368,166 B2 | 5/2008 | Goldstein et al. |
| 2003/0213267 A1 * | 11/2003 | Mossadegh et al. ........... 65/389 |
| 2005/0000599 A1 | 1/2005 | Liebermann et al. |
| 2005/0120749 A1 | 6/2005 | Adar et al. |
| 2006/0130995 A1 * | 6/2006 | Adar et al. .................... 164/461 |
| 2006/0266543 A1 | 11/2006 | Clare et al. |
| 2007/0209776 A1 * | 9/2007 | Adenot-Engelvin et al. . 164/462 |

OTHER PUBLICATIONS

International Search Report of Application No. PCT/IL2009/000016 mailed on May 27, 2009.

E.N. Khandogina et al., "Magnetic, mechanical properties and structure of amorphous glass coated microwires," Journal of Magnetism and Magnetic Materials 249, 2002, pp. 55-59, Elsevier Science B.V.

S.A. Baranov, "A Three-Layer Model of an Amorphous Microwire," Surface Engineering and Applied Electrochemistry, 2010, pp. 271-275, vol. 46, No. 3, Allerton Press, Inc.

* cited by examiner

GLASS-COATED WIRES AND METHODS FOR THE PRODUCTION THEREOF

CROSS-REFERENCE TO RELATED APPLICATIONS

This application is a National Phase Application of PCT International Application No. PCT/IL2009/000016, International Filing Date Jan. 4, 2009, entitled "Glass-Coated Wires and Methods for the Production thereof", published on Jul. 9, 2009 as International Patent Application Publication Number WO 2009/083994 claiming priority of Israel Patent Application 188559, filed Jan. 3, 2008, which is incorporated herein by reference in its entirety.

CROSS-REFERENCE

This application claims priority of Israeli Patent application 188559 filed on Jan. 3, 2008, the entire disclosure of which is incorporated herein by reference.

FIELD

The invention relates to production of glass-coated wires.

BACKGROUND

Glass-coated wires generally, although not necessarily, comprise a relatively small-diameter metal core (typically ranging in diameter from 1 μm up to any larger diameter) covered with a relatively thin glass coating a few μm in thickness. These types of wires have found numerous applications in wire markets, including micro-wire markets, for example, in miniature electronic components; in security tags for personnel; in anti-theft tags for goods and merchandise; in anti-counterfeiting applications as well as in communication wires; and the like.

A method for glass coating of metal wires was first described by G. F. Taylor in 1924, and subsequently improved for relatively large-scale production by Ulitovsky in 1948. Generally referred to as the Taylor-Ulitovsky Process, the process is based on heating a glass tube containing a metal to a point where the metal melts and the glass, which has a substantially higher melting point than the metal, softens from the applied heat. The glass is then drawn out to form a capillary tube with the molten metal forming a metal core inside the tube. Frequently, electromagnetic induction is used to heat the metal until melting, and the heat of the metal used to heat up the glass until it softens any may be drawn out.

SUMMARY

An aspect of some embodiments of the invention relates to providing a method, apparatus, and a system for producing a glass-coated wire wherein a core material and a glass material used to form the glass-coated wire may be selected such that a melting temperature of the core material and a drawing temperature of the glass material (a temperature at which the glass may be stretched) are independent of each other.

In the prior art, use of the Taylor-Ulitovsky method involves melting the core material inside a glass tube. Using heat created by electromagnetic induction, the core material, for example a metal (or a metal alloy) is melted and the heat of the metal softens (melts) the glass to a drawing temperature. This requires matching between the melting temperature of the metal and the glass drawing temperature. Consequently, the glass' technological viscosity necessary for glass-coated wire casting must be achieved at a temperature which is approximately equal to that of the metal melting temperature, inherently limiting a possibility of producing the glass-coated wire from high temperature metals (as it is difficult to choose glass types having drawing temperature which match the melting temperature of the high temperature metals). A similar problem exists with producing glass-coated wire from low temperature metals, for example with Pb (lead) or with Sn (tin) whose melting temperatures, Tm=327° C. and Tm=232° C., respectively, are much lower compared to the drawing temperature of glass (1100° C.).

As previously discussed, based on the Taylor-Ulitovsky method, glass-coated wires are generally fabricated using a glass tube containing a metal batch which is heated to a temperature sufficient to melt the metal by an electromagnetic field of an inductor. The molten metal then softens the glass-tube walls. Usually, the magnetic field of the inductor keeps the molten metal in the glass tube in a suspended state in a mid-portion of the inductor; so-called "method of suspended drop". A glass capillary is then drawn from the soft glass portion and wound on a rotating coil. As a result the glass-coated wire is formed from a "microbath" comprising the molten metal and the glass formed into a glass capillary filled with conductive metal core, allowing a continuous glass-coated wire to be formed.

Although the Taylor-Ulitovsky process may seem an inherently simple technique, there are a number of interrelated variables over which careful control is required, and which may place limitations on mass production of glass-coated wire using the process. An important factor in achieving a stable process is an ability to maintain a constant size of micro-bath. For example, for a continuous process, continuous addition of metal is required using a metal feedstock which is fed into the melt at a pre-determined rate. Furthermore, as metal and glass are used up the glass requires continuous supply by a feeding tool in the area of the inductor. At the same time, the melting temperature of the metal is required to be controlled by varying a position of the metal within the inductor (under other equal conditions), while a wire diameter is controlled by varying the drawing speed. Careful control of these variables is essential as a reduction in the speed of drawing results in an increase in wire diameter while an increase in drawing speed results in a decrease in wire diameter. For example, a 20 micron wire may require a drawing speed of approximately 800 m/sec, while a 100 micron wire may require a drawing speed of approximately 10 m/sec.

According to an aspect of some embodiments of the invention, there is provided an apparatus for producing a glass-coated wire, the apparatus adapted to separately melt the core material and soften the glass for drawing, enabling a core material with a substantially higher melting temperature than that of the glass to be used in the glass-coated wire. Optionally, the melting temperature of the core material may be the same or substantially lower compared to that of the glass.

In an embodiment of the invention, the apparatus comprises a first heating device which is heated by a first electromagnetic inductor, the first device adapted to melt the core material; and further comprises a second device which is heated by a second electromagnetic inductor, the second device adapted to soften the glass for drawing. The first device may be of heat-resistant steel, and is used for production of glass-coated wire from low temperature metals, for example, lead, copper, aluminum, and the like. Such melting technology allows for a use of an inductor frequency range, from 0.5 kHz up to 30 kHz for the first inductor, for example, 2-10 kHz, providing relatively superior energy characteristics for the process. For preparation of glass-coated wire from high temperature metals a ceramic device may be used. Use of the ceramic device may be necessary as the melting temperature of the high temperature metals, for example, platinum (Tm=1769° C.), is higher than the operating temperature of the device made from heat-resistant steel. In this case the heating may be made within a frequency range of 30-800 kHz, for example, 66-500 kHz.

In some embodiments of the invention, the molten core material flows out (as a stream or drops, depending on production requirements) from the first device into the second device. The second device, which may be made of heat-resistant steel, is further adapted to allow the molten core material to combine with the softened glass forming a glass-coated wire. The glass-coated wire (glass capillary tube filled with the molten core) may then be drawn from the second device for cooling and subsequent processing as may be required for producing the glass-coated wire (for example, spooling). A continuous feeding of core material into the first device and of glass material into the second device may allow for a continuous production of glass-coated wire.

In some embodiments of the invention, the core material may be melted in the second device if the melting point of the core material is substantially close to that of the glass material. The core material may be placed in the second device in a first region physically separated from the glass material which occupies a second region, and may be melted in the device by thermal conductivity from the heated glass. The molten metal may then combine with the softened glass forming the glass-coated wire. The glass-coated wire may then be drawn from the device for cooling and subsequent processing.

According to an aspect of some embodiments of the invention, there is provided a system for producing a glass-coated microwire with an essentially circular cross-section. The system, which comprises the above-described apparatus, also comprises a cooling device for cooling the drawn glass-coated wire. The cooling device, which may include a tank with a cooling liquid, is adapted to provide the drawn glass-coated wire with a stable, non-turbulent cooling environment, rather than passing through an unstable and turbulent cooling stream as is common in the art. As a result, uniformed cooling is applied to all sides of the glass-coated wire, and a uniform and undistorted glass coating may be achieved. A uniform essentially circular cross-section is obtained for the glass-coated wire.

There is provided, in accordance with an embodiment of the invention, an apparatus for producing a glass-coated wire, the apparatus comprising at least one heating device adapted to, independently, heat a core material to a melting temperature thereof and heat a glass material to a drawing temperature thereof. Optionally, the apparatus further comprises an outlet adapted to combine the molten core material with the heated glass material to form a wire comprising molten core material coated with glass. In some embodiments of the invention, the apparatus further comprises at least one electromagnetic inductor adapted to heat the at least one heating device. Optionally, the at least one heating device comprises a heat-resistant metal. Additionally or alternatively, the at least one heating device comprises a heat-resistant ceramic. Optionally, the core material is continuously fed to the at least one heating device. Optionally, the glass material is continuously fed to the at least one heating device.

In some embodiments of the invention, the apparatus further comprises a first heating device adapted to heat the core material to a melting temperature thereof, and a second heating device adapted to heat the glass material to a drawing temperature thereof. Optionally, the apparatus further comprises a conducting tube adapted to conduct molten core material flow from the first device to the second device. Optionally, the molten core material flow is a stream. Additionally or alternatively, the molten core material flow comprises falling drops. Optionally, the second device comprises a first region adapted to contain the molten core material. Optionally, the second device comprises a second region adapted to contain the heated glass material.

There is provided, in accordance with an embodiment of the invention, a method for producing a glass-coated wire, the method comprising independently, heating a core material to a melting temperature thereof and heating a glass material to a drawing temperature thereof; and combining the molten core material with the heated glass material to form a wire comprising molten core material coated with glass. Optionally, the method further comprises independently heating by electromagnetic induction. Optionally, the method further comprises continuously feeding the core material. Optionally, the method further comprises continuously feeding the glass material In some embodiments of the invention, the method further comprises heating the core material in a first heating device, and heating the glass material in a second heating device. Optionally, the first device and/or the second device comprise a heat-resistant metal. Optionally, the first device and/or second device comprise a heat-resistant ceramic. Additionally or alternative, the method further comprises conducting molten core material flow from the first device to the second device. Optionally, the molten core material flow is a stream. Optionally, the molten core material flow comprises falling drops. Optionally, the method further comprises containing the molten core material in a first region in the second device. Additionally or alternative, the method further comprises containing the heated glass material in a second region in the second device.

There is provided, in accordance with an embodiment of the invention, a system for producing a glass-coated wire the system comprising an apparatus for producing a glass-coated wire, the apparatus comprising at least one heating device adapted to, independently, heat a core material to a melting temperature thereof and heat a glass material to a drawing temperature thereof and a cooling device for cooling the glass-coated wire. Optionally, the cooling device comprises a tank filled with a liquid. Optionally, cooling device further comprises at least one pulley inside the tank around which the glass-coated wire passes. Additionally or alternatively, the cooling device further comprises at least one pulley outside the tank around which the glass-coated wire passes.

In some embodiments of the invention, the system further comprises an outlet adapted to combine the molten core material with the heated glass material to form a wire comprising molten core material coated with glass. In some embodiments of the invention, the system further comprises at least one electromagnetic inductor adapted to heat the at least one heating device. Optionally, the at least one heating device comprises a heat-resistant metal. Additionally or alternatively, the at least one heating device comprises a heat-resistant ceramic. Optionally, the core material is continuously fed to the at least one heating device. Optionally, the glass material is continuously fed to the at least one heating device.

In some embodiments of the invention, the system further comprises a first heating device adapted to heat the core material to a melting temperature thereof, and a second heating device adapted to heat the glass material to a drawing temperature thereof. Optionally, the system further comprises a conducting tube adapted to conduct molten core material flow from the first device to the second device. Optionally, the molten core material flow is a stream. Additionally or alternatively, the molten core material flow comprises falling drops. Optionally, the second device comprises a first region adapted to contain the molten core material. Optionally, the second device comprises a second region adapted to contain the heated glass material.

In some embodiments of the invention, the at least one heating device comprises a first region adapted to heat the core material to the melting temperature thereof, and a second region adapted to heat the glass material to the drawing temperature thereof.

In some embodiments of the invention, the core material comprises a metal, a metal alloy, an elemental semiconductor, a non-ceramic semiconducting compound, or ceramic powder, or any combination thereof. Additionally or alternatively, the core material is shaped as a rod, a bar, or a wire. Optionally, the glass material comprises alkali silicate, borosilicate, aluminosilicate, quartz, silica, soda-lime, lead, or any combination thereof. Additionally or alternatively, the glass material comprises a form of a glass powder, a glass ball, or a glass tube.

There is provided, in accordance with an embodiment of the invention, a glass coated metal wire comprising an essentially circular cross-section.

There is provided, in accordance with an embodiment of the invention, an apparatus for producing a glass-coated wire, the apparatus comprising a first device adapted to be heated to a first temperature, the first temperature adapted to melt a core material; a second device adapted to be heated to a second temperature, the second temperature adapted to bring a glass material to a drawing temperature; and an outlet adapted to combine the molten core material with the heated glass material to form a wire comprising molten core material coated with glass. Optionally, the first temperature is greater than or equal to the second temperature. Optionally, the first temperature is less than the second temperature. Optionally, the apparatus further comprises a first electromagnetic inductor adapted to heat the first device. Optionally, the apparatus further comprises a second electromagnetic inductor adapted to heat the second device. Additionally or alternatively, the core material is continuously fed to the first device. Optionally, the glass material is continuously fed to the second device. Optionally, the first device and/or the second device comprise a heat-resistant metal. Optionally, the first device and/or second device comprise a heat-resistant ceramic. Additionally or alternatively, the apparatus further comprises a conducting tube adapted to conduct molten core material flow from the first device to the second device. Optionally, the molten core material flow is a stream. Optionally, the molten core material flow comprises falling drops. Optionally, the second device comprises a first region adapted to contain the molten core material. Optionally, the second device comprises a second region adapted to contain the heated glass material.

There is provided, in accordance with an embodiment of the invention, an apparatus for producing a glass-coated wire, the apparatus comprising a device comprising at least a first region and a second region, the first region is adapted to contain a core material and the second region is adapted to contain a glass material, wherein the device is adapted to be heated, to melt the core material and to bring a glass material to a drawing temperature; and an outlet adapted to combine the molten core material with the heated glass material to form a molten core material coated with glass. Optionally, the apparatus further comprises an electromagnetic inductor adapted to heat the device. Optionally, the core material is continuously fed to the first region. Additionally or alternatively, the glass material is continuously fed to the second region. Optionally, the device comprises a heat-resistant metal. Optionally, the device comprises a heat-resistant ceramic.

There is provided, in accordance with an embodiment of the invention, a system for producing a glass-coated wire the system comprising an apparatus for producing a glass-coated wire, the apparatus comprising a first device adapted to be heated to a first temperature, the first temperature adapted to melt a core material; a second device adapted to be heated to a second temperature, the second temperature adapted to bring a glass material to a drawing temperature; an outlet adapted to combine the molten core material with the heated glass material to form a wire comprising molten core material coated with glass; and a cooling device for cooling the glass-coated wire. Optionally, the cooling device comprises a tank filled with a liquid. Optionally, the cooling device further comprises at least one pulley inside the tank around which the glass-coated wire passes. Additionally or alternatively, the cooling device further comprises at least one pulley outside the tank around which the glass-coated wire passes. Optionally, the first temperature is greater than or equal to the second temperature. Optionally, the first temperature is less than the second temperature. Optionally, the apparatus further comprises a first electromagnetic inductor adapted to heat the first device. Optionally, the apparatus further comprises a second electromagnetic inductor adapted to heat the second device. Additionally or alternatively, the core material is continuously fed to the first device. Optionally, the glass material is continuously fed to the second device. Optionally, the first device and/or the second device comprise a heat-resistant metal. Optionally, the first device and/or second device comprise a heat-resistant ceramic. Additionally or alternatively, the apparatus further comprises a conducting tube adapted to conduct molten core material flow from the first device to the second device. Optionally, the molten core material flow is a stream. Optionally, the molten core material flow comprises falling drops. Optionally, the second device comprises a first region adapted to contain the molten core material. Optionally, the second device comprises a second region adapted to contain the heated glass material.

There is provided, in accordance with an embodiment of the invention, a system for producing a glass-coated wire the system comprising an apparatus for producing a glass-coated wire, the apparatus comprising a device comprising at least a first region and a second region, the first region is adapted to contain a core material and the second region is adapted to contain a glass material, wherein the device is adapted to be heated, to melt the core material and to bring a glass material to a drawing temperature; an outlet adapted to combine the molten core material with the heated glass material to form a molten core material coated with glass; and a cooling device for cooling the glass-coated wire. Optionally, the apparatus further comprises an electromagnetic inductor adapted to heat the device. Optionally, the core material is continuously fed to the first region. Additionally or alternatively, the glass material is continuously fed to the second region. Optionally, the device comprises a heat-resistant metal. Optionally, the device comprises a heat-resistant ceramic.

In some embodiments of the invention, the glass material comprises a form of a glass powder, a glass ball, or a glass tube. Optionally, the glass material comprises alkali silicate, borosilicate, aluminosilicate, quartz, silica, soda-lime, lead, or any combination thereof.

In some embodiments of the invention, the core material is shaped as a rod, a bar, or a wire. Optionally, the core material comprises a metal, a metal alloy, an elemental semiconductor, a non-ceramic semiconducting compound, or ceramic powder, or any combination thereof.

There is provided, in accordance with an embodiment of the invention, a method for producing a glass-coated wire, the method comprising heating a first device containing a core material to a first temperature, thereby melting the core material; heating a second device containing a glass material to a second temperature, thereby bringing the glass material to a drawing temperature; and combining the molten core material with the heated glass material to form a wire comprising molten core material coated with glass. Optionally, the first temperature is greater than or equal to the second temperature. Optionally, the first temperature is less than the second temperature. Additionally or alternatively, the method further comprises heating the first device with a first electromagnetic inductor. Optionally, the method further comprises heating the second device with a second electromagnetic inductor. Optionally, the method further comprises continuously feeding the core material is to the first device. Optionally, the method further comprises continuously feeding the glass material to the second device. Additionally or alternatively, the first device and/or the second device comprise a heat-resistant metal. Optionally, the first device and/or second device comprise a heat-resistant ceramic. Optionally, the method further comprises conducting molten core material flow from the first device to the second device. Optionally, the molten core material flow is a stream. Optionally, the molten core material flow comprises falling drops. Optionally, the method further comprises containing the molten core material in a first region in the second device. Optionally, the method further comprises containing the heated glass material in a second region in the second device.

There is provided, in accordance with an embodiment of the invention, a method for producing a glass-coated wire, the method comprising feeding a core material to a first region of a device; feeding a glass material to a second region of the device; heating the device thereby to melting the core material and bringing the glass material to a drawing temperature; and combining the molten core material with the heated glass material to form a molten core material coated with glass. Optionally, the method further comprises heating the device using electromagnetic induction. Optionally, the method further comprises continuously feeding the core material to the first region. Additionally or alternatively, the method further comprises continuously feeding the glass material to the second region. Optionally, the device comprises a heat-resistant metal. Optionally, the device comprises a heat-resistant ceramic.

In some embodiments of the invention, the method further comprises shaping the core material as a rod, a bar, or a wire. Optionally, the core material comprises a metal, a metal alloy, an elemental semiconductor, a non-ceramic semiconducting compound, or ceramic powder, or any combination thereof.

In some embodiments of the invention, the method further comprises forming the glass material into a glass powder, a glass ball, or a glass tube. Optionally, the glass material comprises alkali silicate, borosilicate, aluminosilicate, quartz, silica, soda-lime, lead, or any combination thereof.

There is provided, in accordance with an embodiment of the invention, a glass-coated metal wire comprising an essentially circular cross-section.

BRIEF DESCRIPTION OF FIGURES

Examples illustrative of embodiments of the invention are described below with reference to figures attached hereto. In the figures, identical structures, elements or parts that appear in more than one figure are generally labeled with a same numeral in all the figures in which they appear. Dimensions of components and features shown in the figures are generally chosen for convenience and clarity of presentation and are not necessarily shown to scale. The figures are listed below.

DETAILED DESCRIPTION

Figure 1:
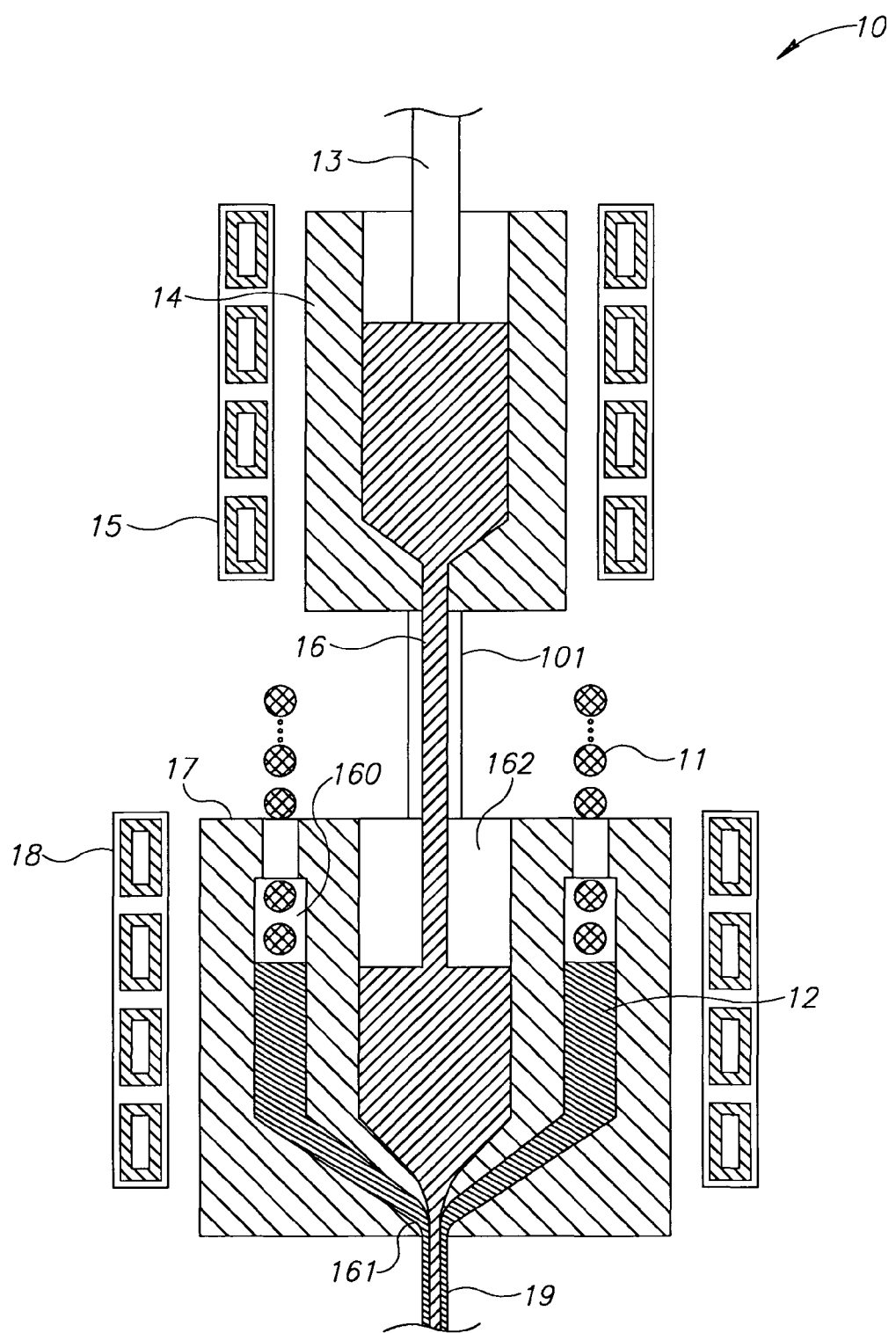
FIG. 1 schematically illustrates an exemplary apparatus for producing a glass-coated wire, in accordance with an embodiment of the invention.

Reference is made to FIG. 1, which schematically illustrates an exemplary apparatus 10 for producing a glass-coated wire 19, in accordance with an embodiment of the invention. Apparatus 10 is adapted to produce a glass-coated wire comprising a core material with a melting temperature and a glass material with a drawing temperature, which are independent from each other. Apparatus 10 comprises a first device 14, which is heated by a first electromagnetic inductor 15, the first device adapted to melt a core material 13, which is fed into the device, for example, continuously. Apparatus 10 further comprises a second device 17 which is heated by a second electromagnetic inductor 18, the second device adapted to melt (soften) a glass material 11 fed into the device, for example, continuously, for drawing as a capillary tube. In accordance with an embodiment of the invention, continuous feeding of core material 13 into first device 14, and of glass material 11 into second device 17, allowing for a continuous production of glass-coated wire. First device 14 and first inductor 15 may be included as part of a first induction heating furnace; and second device 17 and second inductor 18, may be included as part of a second induction heating furnace.

The term "continuous" or "continuous production" may refer to, according to some embodiments, a process that produces a required length of wire (such as glass-coated wire) without a need to connect two or more segments of a wire to form the required length of wire. The term "continuous" or "continuous production" may also refer to, according to some embodiments, a process that can produce a required length of a wire (such as glass coated wire) for as long as the core material and glass material are being fed into the system.

The term "device", which may also be referred to as "heating device", may refer to, according to some embodiments, any equipment or part of an equipment that can be heated and/or generate heat, for example, a crucible, furnace, oven, heating system, and the like.

First device 14 may be of heat-resistant steel, and may be used for production of glass-coated wire from low temperature metals, for example, lead, copper, aluminum, and the like. Such melting technology allows for a use of an inductor frequency range from 0.5-30 kHz, for example, from 2 kHz up to 10 kHz for first inductor 15, providing relatively superior energy characteristics for the process. For preparation of glass-coated wire from high temperature metals first device 15 may be a heat-resistant ceramic device. Use of the ceramic device may be necessary as the melting temperature of the high temperature metals, for example, platinum (Tm=1769° C.), is higher than the operating temperature of the device made from heat-resistant steel. In this case the heating may be made within a frequency range of 30-800 kHz, for example, 66-500 kHz.

Core material 13 may comprise any shape adapted to be received by first device 14, for example, rod-shaped, wire-shaped, bar-shaped, and the like, and may be of a continuous length or optionally, limited length. A diameter for a rod-shaped core material 13 may range from 0.1 mm-15 mm, for example, from 0.1 mm-1 mm, 1 mm-2 mm, 2 mm-6 mm, 6 mm-8 mm, 8 mm-12 mm, 12 mm-15 mm. In accordance with an embodiment of the invention, core material 13 may be any metal, metal alloy, elemental semiconductor, non-ceramic semiconducting compound, or metallic based superconductors, with melting temperatures greater than that of glass. Optionally, core material 13 may have a melting temperature equal to or lesser than glass. Examples of metals may include copper, gold, silver, titanium, platinum, rhodium, iron, lead, nickel, alloys of these metals, and the like. Examples of semiconductors may include Silicon (Si), Germanium (Ge), and the like. Examples of non-ceramic semiconducting compounds may include Galium Antimonide (GaSb) and Indium Antimonide (InSb).

In accordance with some embodiments of the invention, molten core material 16 produced in first device 14 by the melting of core material 13, flows out of the first device, through a conducting tube 101 (optionally thermally insulated) joining the first device with second device 17, into a first region comprising a cavity 162 in the second device. Flow of molten core material 16 from first device 14 into second device 17 may be in the form of a continuous stream or continuous falling drops, depending on production requirements. Optionally, the flow may be intermittent (stops after a period of time).

Second device 17, which may be made of heat-resistant steel, is further adapted to allow molten core material 16 to combine with a softened glass 12 forming a glass-coated wire. Glass material 11, which may be in the form of a glass powder, glass balls, glass tubes, and the like, may be fed, for example, continuously, into a second region comprising a funnel cavity 160 in second device 17. Glass material 11 may comprise, for example, quartz, silica, alkali silicate, soda-lime, borosilicate, aluminosilicate, lead, or any combination thereof. Glass material 11 is melted into softened glass 12 by the heat generated in second device 17 by second inductor 18, the softened glass shaped as a funnel inside funnel cavity 160 with a small hole at an outlet 161.

Softened glass 12 then flows (or is drawn out) from second device 17 through outlet 161, the outlet adapted to combine molten core material 16 with softened glass 12 as it is stretched into a capillary tube at the outlet, forming glass-coated wire 19. A size of outlet 161 is dependent on a required diameter of glass-coated wire 19, for example, as may be ordered by an end-user of the wire. The size may be limited by a surface tension of softened glass 12 at a condition of viscosity which allows for control of the flow of the softened glass and/or molten metal 16. A vacuum may be used to improve surface tension conditions, and may allow for a larger outlet size, for example, 5 mm diameter.

Figure 2:
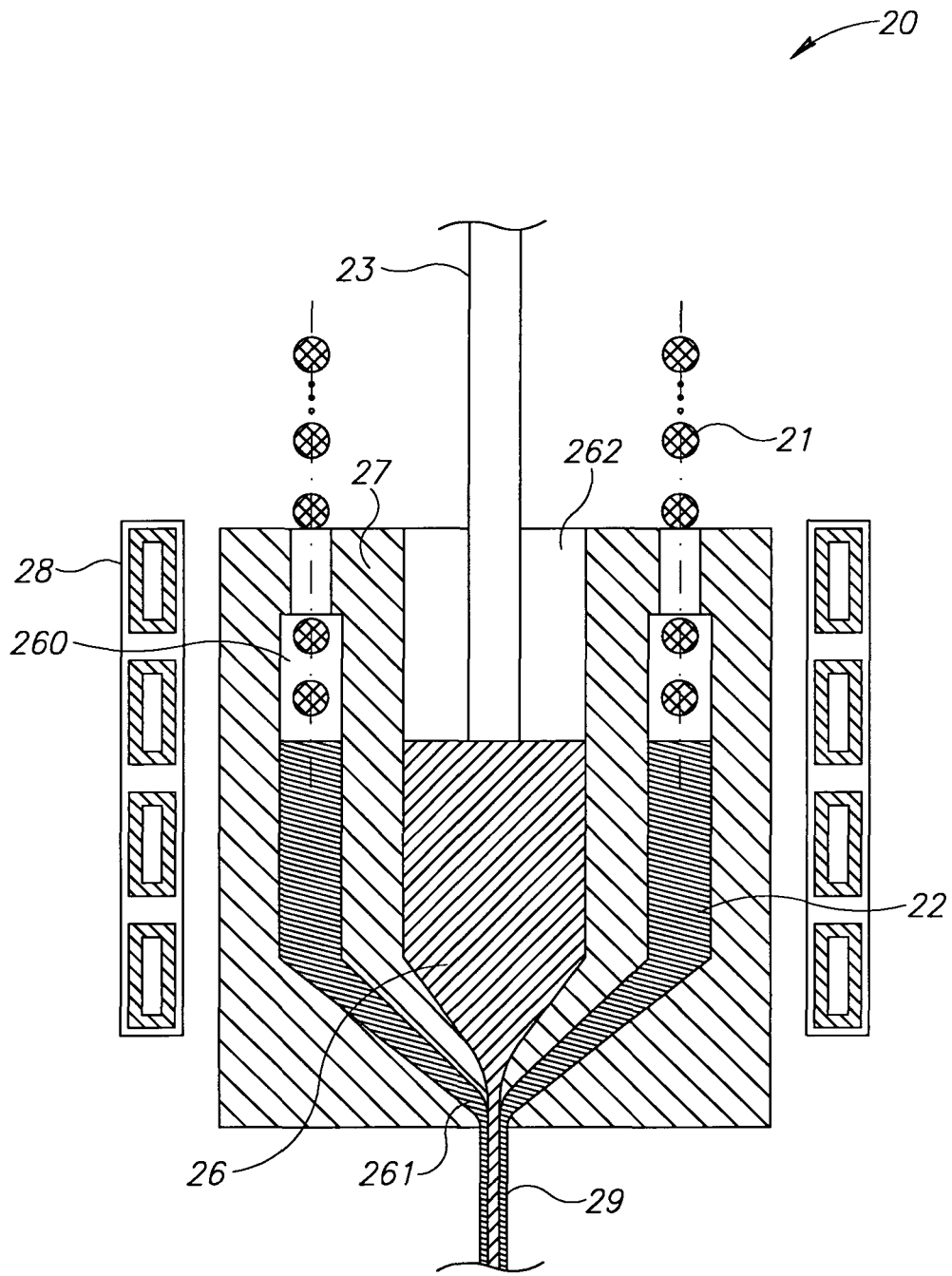
FIG. 2 schematically illustrates an exemplary apparatus for producing a glass-coated wire, in accordance with another embodiment of the invention.

Reference is made to FIG. 2, which schematically illustrates an exemplary apparatus 20 for producing a glass-coated wire 29, in accordance with another embodiment of the invention. Apparatus 20 comprises a device 27 which is heated by an electromagnetic inductor 28, the device adapted to produce a glass-coated wire 29 from a core material 23 and a glass material 21 comprising a similar (close) melting temperature and drawing temperature, respectively. Inductor 28 and device 27, comprising a cavity 262 (first region), funnel cavity 260 (second region), and an outlet 261, may be similar to second inductor 18 and second device 17 shown in FIG. 1, including cavity 162, funnel cavity 160, and outlet 161, respectively. Glass material 21 may be the same as that shown in FIG. 1 at 11.

In accordance with an embodiment of the invention, core material 23 which may be shaped similar to core material 13 in FIG. 1 is placed in cavity 262 where it may be melted into molten core material 26 by thermal conductivity from the melting of glass material 21 into softened glass 22. Softened glass 22 flows (or is drawn out) from device 27 through outlet 261, molten core material combining with softened glass 22 as it stretches into a capillary tube at the outlet, forming glass-coated wire 29.

Figure 3:
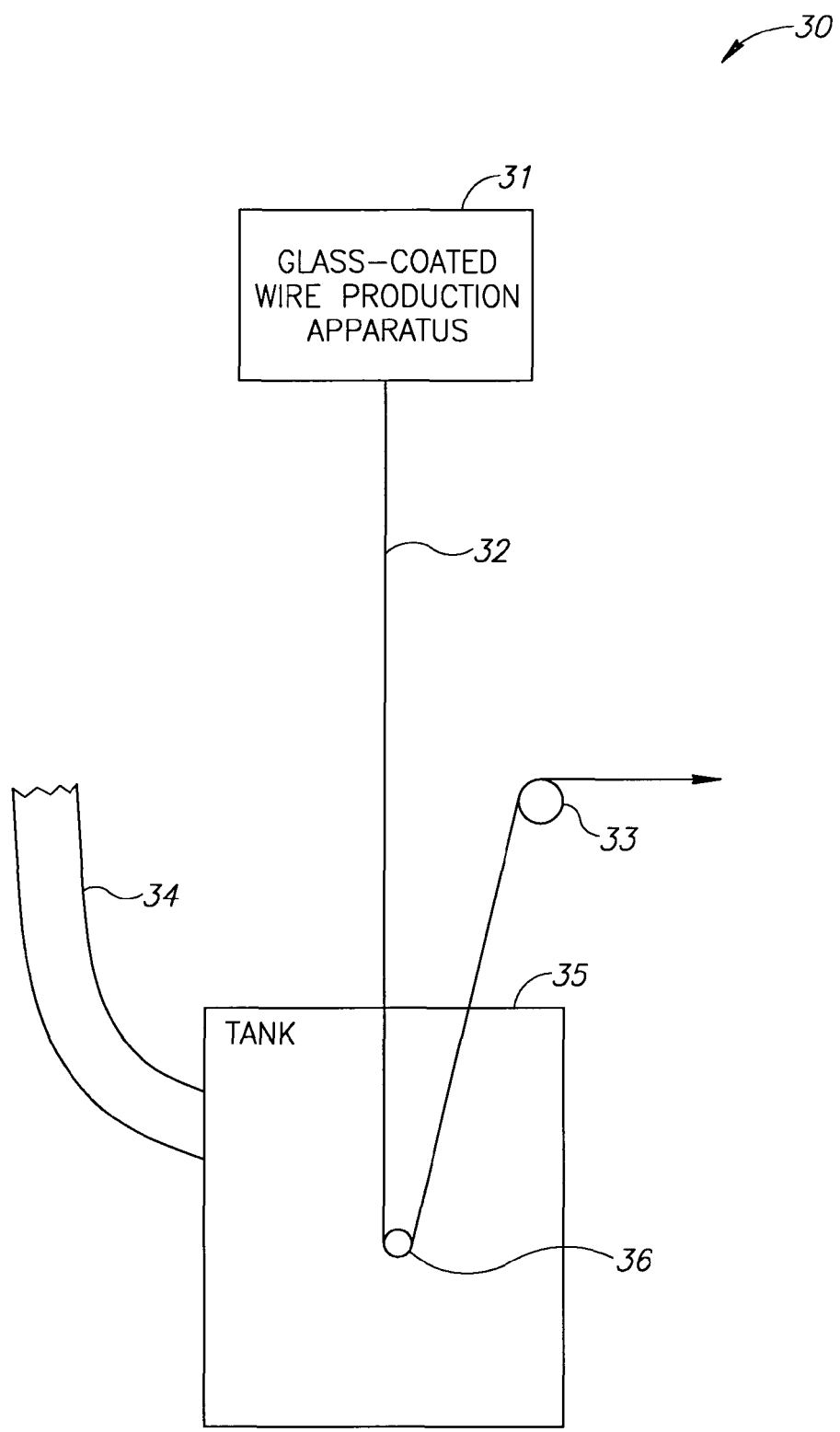
FIG. 3 schematically illustrates an exemplary system for producing a glass-coated wire with an essentially circular cross-section, in accordance with an embodiment of the invention.

Reference is made to FIG. 3, which schematically illustrates an exemplary system 30 for producing a glass-coated wire 32 with an essentially circular cross-section, in accordance with an embodiment of the invention. System 30 comprises a glass-coated wire production apparatus 31 and a cooling device 35 for cooling a drawn capillary tube filled with the molten core material (glass-coated wire 32). Cooling device 35, which may include a tank with a cooling liquid, is adapted to provide drawn glass-coated wire 32 with a stable, non-turbulent cooling environment, rather than passing through an unstable and turbulent cooling stream as is common in the art. As a result, uniformed cooling is applied to all sides of glass-coated wire 32, and a uniform and undistorted glass coating may be achieved. A uniform essentially circular cross-section is obtained for glass-coated wire 32. Apparatus 31 and glass-coated wire 32 may be the same or substantially similar to that shown in FIG. 1 at 10 and 19, respectively. Optionally, apparatus 31 and glass-coated wire 32 may be the same or substantially similar to that shown in FIG. 2 at 20 and 29.

System 30 further comprises at least one pulley 36 inside tank 35, and at least one pulley 33 outside of tank 35, the pulleys adapted to allow glass-coated wire 32 to be pulled through cooling tank 35 at a constant rate as it is being spooled, thereby maintaining a uniform cooling rate along a length of the glass-coated wire. Additionally comprised is a liquid inlet line 34 adapted to allow a flow of cooling liquid into tank 35, as may be required to maintain appropriate cooling liquid temperature levels inside the tank. The cooling liquid may include any liquid suitable for cooling glass-coated wire 32 and may include, for example, water, oil, alcohol, emulsions, and the like.

Figure 4:
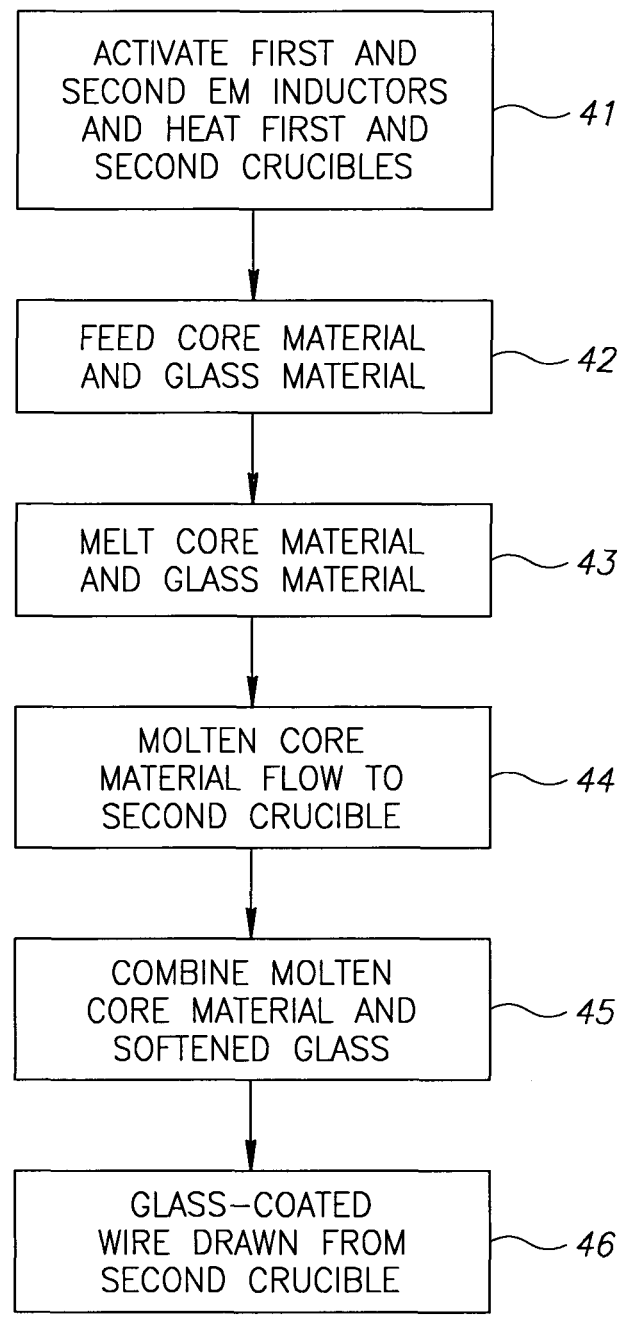
FIG. 4 schematically illustrates a flow chart illustrating a method for producing a glass-coated wire, in accordance with an embodiment of the invention.

Reference is made to FIG. 4, which schematically illustrates a flow chart illustrating an exemplary method for producing a glass-coated wire with apparatus 10 shown in FIG. 1, in accordance with an embodiment of the invention. The exemplary method described is not intended to be limiting in any form or manner, and a person skilled in the art may appreciate that variations are possible in the implementation of the method.

[Step 41] In a first step of the method, the temperature of first device 14 must be heated to a melting temperature of core material 13. First electromagnetic inductor 15 is energized so as to cause heating of the first device. Similarly, the temperature of second device 17 must be heated to a drawing temperature of glass material 11. Second electromagnetic inductor 18 is energized so as to cause heating of the second device.

[Step 42] In a second step of the method and following first device 14 and second device 17 reaching the required temperatures, respectively, core material 13 is fed into the first device and glass material 11 is fed into funnel cavity 160 in the second device. Feeding of the core material and the glass material may be continuous so as to achieve a continuous production of glass-coated wire 19. Optionally, feeding of the materials may be of a limited duration.

[Step 43] In a third step of the method, core material 13 is melted in first device 14 into molten core material 16, and glass material 11 is melted in softened glass 12.

[Step 44] In a fourth step of the method, molten core material 16 flows into cavity 162 in second device 17. The flow of molten core material may be in a stream from an outlet in first device 14 through a duct into the cavity. Optionally, the flow may be as drops. The flow of the molten core may be continuous, or intermittent, varying according to production requirements.

[Step 45] In fifth step of the method, softened glass 12 flows (or is drawn out) from device 17 through outlet 161, and combines with molten core material 16 flowing from cavity 162 as the softened glass is stretched into a capillary tube at the outlet.

[Step 46] In a sixth step of the method, glass-coated wire 19 in the form of a glass capillary tube with molten core material inside is drawn out from second device 17 for cooling.

In the description and claims of embodiments of the present invention, each of the words, "comprise" "include" and "have", and forms thereof, are not necessarily limited to members in a list with which the words may be associated.

The invention has been described using various detailed descriptions of embodiments thereof that are provided by way of example and are not intended to limit the scope of the invention. The described embodiments may comprise different features, not all of which are required in all embodiments of the invention. Some embodiments of the invention utilize only some of the features or possible combinations of the features. Variations of embodiments of the invention that are described and embodiments of the invention comprising different combinations of features noted in the described embodiments will occur to persons with skill in the art.

What we claim is:

1. A method for producing a glass-coated micro-wire having a metal core, wherein the method provides for continuous production of the glass-coated micro-wire, the method comprising:

providing a first heating device and a second heating device, which is physically separated and spaced apart from the first heating device, said first and second heating devices being independently operable, wherein the second heating device has a central cavity region connected to an outlet of the first heating device by a thermally insulated tube, and a peripheral funnel cavity region, physically separated from the central cavity region in said second heating device, said central cavity region adapted to receive and contain molten core material thereinside and having an outlet located above and concentric with an outlet of the funnel cavity;

separately feeding a metal core material into the first heating device and separately feeding a glass material into the peripheral funnel cavity region of the second heating device;

independently melting the metal core material in said first heating device by heating it by an electromagnetic field of an inductor to a temperature higher than a drawing temperature of the glass, and separately and independently heating the glass material in the peripheral funnel cavity in said second heating device to the drawing temperature of the glass material thereby softening the glass and shaping the softened glass as a funnel having a central hole, said independent heating of the metal core to the temperature higher than the drawing temperature of the glass material defining a temperature difference for providing energy characteristics of the process needed for the molten metal core and softened glass materials to combine and form a glass-coated micro-wire;

streaming molten metal core material from said first heating device through said thermally insulated tube into the central cavity region of the second heating device, and containing the streamed molten metal core material inside the cavity region while maintaining its higher temperature;

continuously flowing the molten metal core material through the outlet in the central cavity region of the second heating device, and drawing the funnel-shaped softened glass from the funnel cavity of the second heating device through the outlet in the funnel cavity in the second heating device, and thereby combining the flowed and drawn metal and glass materials at the different temperatures at the central hole of the funnel-shaped softened glass material, thereby combining the molten metal core while in its higher temperature level with the softened glass material and obtaining said molten metal core material coated with the softened glass at the outlet of the second heating device.

2. The method of claim 1 wherein at least one of the first heating device and the second heating device comprises a heat-resistant metal.

3. The method of claim 1 wherein at least one of the first heating device and the second heating device comprises a heat-resistant ceramic.

4. The method of claim 1 wherein the continuous feeding of the glass material is carried out by feeding at least one of the following: glass powder, glass balls and glass tubes.

5. The method of claim 1 further comprising passing the molten metal core material coated with the softened glass through a cooling liquid thereby applying uniform cooling to all sides of the drawn glass coated micro-wire to thereby obtain uniform undistorted glass coating and essentially circular cross-section glass coated micro-wire.

6. The method of claim 1 wherein the flow of the molten core material comprises falling drops.

7. The method of claim 1 wherein frequency of the electromagnetic filed field is in the range of 0.5 to 30 kHz.

8. The method of claim 7 wherein frequency of the electromagnetic field is in the range of 2 to 10 kHz.

9. The method of claim 1 comprising controlling thickness of the glass coat of the micro-wire by application of vacuum conditions inside the funnel cavity.

10. A method for producing a glass-coated micro-wire having a metal core, wherein the method provides for continuous production of the glass coated micro-wire, the method comprising:

providing a first heating device and a second heating device, which is physically separated and spaced apart from the first heating device, said first and second heating devices being independently operable, wherein the second heating device has a central cavity region connected to an outlet of the first heating device by a thermally insulated tube, and a peripheral funnel cavity region, physically separated from the central cavity region in said second heating device, said central cavity region adapted to receive and contain molten core material thereinside and having an outlet located above and concentric with an outlet of the funnel cavity;

separately feeding a metal core material into the first heating device and separately feeding a glass material into the peripheral funnel cavity region of the second heating device;
independently melting the metal core material by heating the metal core material in said first heating device to a temperature higher than a drawing temperature of the glass by an electromagnetic field of an inductor, and separately and independently heating the glass material in the peripheral funnel cavity in said second heating device to the drawing temperature of the glass material thereby softening the glass and shaping the softened glass as a funnel having a central hole, said independent heating of the metal core to the temperature higher than the drawing temperature of the glass material defining a temperature difference for providing energy characteristics of the process needed for the molten core and softened glass materials to combine and form a glass-coated micro-wire;
streaming molten metal core material from said first heating device through said thermally insulated tube into the central cavity region of the second heating device, and containing the streamed molten metal core material inside the cavity region while maintaining its higher temperature;
continuously flowing the molten metal core material through the outlet in the central cavity region of the second heating device, and drawing the funnel-shaped soften glass from the funnel cavity of the second heating device through the outlet in the funnel cavity in the second heating device, and thereby combining the flowed and drawn metal and glass materials at the different temperatures at the central hole of the funnel-shaped softened glass material, thereby combining the molten metal core while in its higher temperature level with the softened glass materials and obtaining said molten metal core material coated with the softened glass at the outlet of the second heating device; and
passing the molten metal core material coated with the softened glass through a cooling liquid thereby uniformly cooling all sides thereof to obtain uniform undistorted glass coating and essentially circular cross-section glass coated micro-wire.

\* \* \* \* \*